US011723383B2

(12) United States Patent
Neto et al.

(10) Patent No.: US 11,723,383 B2
(45) Date of Patent: Aug. 15, 2023

(54) EXTRUDED FEED FORMULA BASED ON CHAFF OF CROPS OR FIELD RESIDUES FOR RUMINANTS AND HORSES

(71) Applicant: Alberto Samaia Neto, Sao Paulo (BR)

(72) Inventors: Alberto Samaia Neto, Sao Paulo (BR); Rodrigo Anselmo Pereira Do Nascimento, Patos de Minas (BR)

( * ) Notice: Subject to any disclaimer, the term of this patent is extended or adjusted under 35 U.S.C. 154(b) by 86 days.

(21) Appl. No.: 15/777,286

(22) PCT Filed: Nov. 16, 2016

(86) PCT No.: PCT/BR2016/050298
§ 371 (c)(1),
(2) Date: May 18, 2018

(87) PCT Pub. No.: WO2017/083949
PCT Pub. Date: May 26, 2017

(65) Prior Publication Data
US 2018/0325143 A1    Nov. 15, 2018

(30) Foreign Application Priority Data

Nov. 18, 2015  (BR) .................... BR102015028882 4
Nov. 14, 2016  (BR) .................... BR132016026605 9

(51) Int. Cl.
| | | |
|---|---|---|
| *A23K 10/37* | (2016.01) | |
| *A23K 50/20* | (2016.01) | |
| *A23K 50/10* | (2016.01) | |
| *A23K 20/142* | (2016.01) | |
| *A23K 20/22* | (2016.01) | |
| *A23K 20/24* | (2016.01) | |
| *A23K 20/26* | (2016.01) | |
| *A23K 20/20* | (2016.01) | |
| *A23K 40/25* | (2016.01) | |
| *A23K 50/15* | (2016.01) | |
| *A23K 20/121* | (2016.01) | |

(52) U.S. Cl.
CPC ............ *A23K 10/37* (2016.05); *A23K 20/121* (2016.05); *A23K 20/142* (2016.05); *A23K 20/22* (2016.05); *A23K 20/24* (2016.05); *A23K 20/26* (2016.05); *A23K 20/30* (2016.05); *A23K 40/25* (2016.05); *A23K 50/10* (2016.05); *A23K 50/15* (2016.05); *A23K 50/20* (2016.05); *Y02P 60/87* (2015.11)

(58) Field of Classification Search
CPC ........ A23K 50/10; A23K 50/15; A23K 10/37; A23K 50/20; A23K 20/121; A23K 20/142; A23K 20/22; A23K 20/24; A23K 20/26; A23K 20/30; A23K 40/25; Y02P 60/877; Y02P 60/87
USPC ........................................................ 426/69
See application file for complete search history.

(56) References Cited

U.S. PATENT DOCUMENTS

| 4,218,437 | A | * | 8/1980 | Hiller | .................... | A23K 20/189 |
| | | | | | | 424/94.66 |
| 4,258,031 | A | * | 3/1981 | Tollett | ..................... | A23K 50/30 |
| | | | | | | 424/115 |
| 4,820,527 | A | * | 4/1989 | Christensen | ........... | A01K 29/00 |
| | | | | | | 426/74 |
| 2003/0168020 | A1 | * | 9/2003 | Levin | .................... | A01K 15/026 |
| | | | | | | 119/709 |
| 2010/0034925 | A1 | * | 2/2010 | Pibarot | .................. | A23K 10/12 |
| | | | | | | 426/496 |
| 2014/0147533 | A1 | | 5/2014 | Solaiman et al. | | |

FOREIGN PATENT DOCUMENTS

| BR | 10601922 | 1/2008 |
| BR | 102013023362 | 11/2015 |
| FR | 2406395 | 5/1979 |
| GB | 2406516 | 4/2005 |

OTHER PUBLICATIONS

NPL Machen et al. [https://agrilifecdn.tamu.edu/animalscience/files/2012/04/ASWeb079-goathaypdf.pdf] (Year: 2012).*
Search_Google_Scholar.pdf (Search result on Aug. 19, 2021 which resulted the above NPL Machen document which has date 2001. However, website date is 2012 as we see above. Therefore, I put latest 2012 date above for NPL Machen document). (Year: 2021).*
NPL Baran et al. (2002). (Year: 2002).*
Google scholar search for sodium monensin (retrieved on Aug. 24, 2021) resulted the NPL Baran reference. (Year: 2021).*
NPL Pigden [ Entitled Derinded sugarcane as an animal feed—a major breakthrough; Year: Review article and under NPL Pigden reference it recites 1972 other discussed refs are 1971, 1972, 1973 ). (Year: 1972).*
NPL Sugarcane Haystack (Retrieved on Oct. 12, 2022) (Year: 2022).*
NPL Sugarcane Herbaceous plant (Retrieved on Oct. 12, 2022) (Year: 2022).*
Google Search Report (Retrieved on Oct. 14, 2022) (Year: 2022).*
Mourao, R. De C; Pancoti, C, G.; Ferreira, A. A.; Vivenza, P. A. D.; Valentini, P. V.; Borges, A. L. Da C. C.; Silva, R. R. e. Aditivos alimentares para vacas leiteiras. Revista electronica nutritime, artigo 179, v, 9, n. 05, p. 2011-2040—Sep./Oct. 2012. todo o documento.

(Continued)

*Primary Examiner* — Donald R Spamer
*Assistant Examiner* — Bhaskar Mukhopadhyay
(74) *Attorney, Agent, or Firm* — Defillo & Associates, Inc.; Evelyn A. Defillo

(57) ABSTRACT

The present patent application refers to a nutritional formulation presented as animal feed, concentrate and supplement, with extruded characteristic, based on crop haystacks or culture residues, with the object to complement or provide nutritional requirements for ruminants and/or equines, disclosing a product with considerable reduction of the final cost, due to the abundance of the raw material as used being originated from annual crop haystacks, improving the utilization of the food contained in the final product, with gains of digestibility, consequently improving the effectiveness of the rational use of nutritional resources with those species.

4 Claims, No Drawings

(56) References Cited

OTHER PUBLICATIONS

Meira, L. L. R. Extrato de planetas como aditivo na nutricao de ruminantes. 2014. 46p. Trabalho de conclusao de curso (Graduacao em Zootecnia)—Escola de Vetereinaria e Zootecnia, Universidade Revisao da literatura.

Quadros, J. B. da S.; Furtado, C. E.; Barbosa, E. D.; Andrade, M. B. de; Trevisan, A. G. Digestibilidade Aparente e Desenvolvimento de Equinos em Crescimiento Submetidos a Dietas Compostas por Diferentes Niveis de Substituicao do Feno de Tifton 85 pela casca de Soja. Revista Brasileira de Zootecnia, v. 33, n. 3, p. 564-574, 2004. Tabelas 2.

Queiroz, A. C.; Barbosa, M. A.; Resende, F. D. De; Pereira, K. C.; Dutra, A. R. Suplementacao da Palhada de Milho na Alimentacao de Bovinos. 1. Consumo, Taxa de Passagem da Materia Seca, Degradacao In situ da Materia Seca e da Fibra em Detergente Neutro. Revista Brasileira der Zootecnia, v. 27, n. 2, p. 381-389, 1998. Todo o documento.

Dominguez, J. L. uso de volumosos conservados na alimentacao de equinos. Revista Brasileira de Zootecnia, v. 38, p. 259-269, 2009. (supl. Especial). todo o documento.

Silva, A. L. Da; Cardoso, E. de S.; Ferreira, A. H. C.; Santana Junior, M. A.; Carbalho, M. E. L. de. Suplementacao para equinas—revisao. Revista electronica nutitrime, artigo 284, vol. 11, n. 06, p. 3810-3819, Nov./Dec. 2014. Tabela 1, 1 paragrafo de coluna da esquerda da pagina 3815, ultimo paragrafo da coluna da direita da pagina 3815.

\* cited by examiner

EXTRUDED FEED FORMULA BASED ON CHAFF OF CROPS OR FIELD RESIDUES FOR RUMINANTS AND HORSES

CROSS REFERENCE TO RELATED APPLICATION

This application is a national stage entry of PCT/BR2016/050298 filed Nov. 16, 2016, under the International Convention claiming priority over Brazilian Patent Application No. BR 10 2015 028882 4 filed Nov. 18, 2015 and Brazilian Patent Application No. BR 13 2016 026605 9 filed Nov. 14, 2016.

FIELD OF THE INVENTION

The present patent application refers to a nutritional formulation in the form of animal feed, concentrate and supplement, with extruded characteristics, based on crop haystacks or culture residues, used for feeding ruminants and/or equine animals.

STATE OF THE ART

The extrusion process as used for obtaining food for ruminant animals is known from the state of the art, as we can prove from the North American patent documents U.S. Pat. No. 5,540,932, dated Apr. 13, 1995, and U.S. Pat. No. 5,683,739, dated Jul. 11, 1996.

Extruded feed is a food which is processed under high temperature, pressure, dragging force and for a short period of time, followed by an abrupt change in pressure, making it become much more useful for animals.

Extrusion is very effective to improve the nutritional value of food of vegetal origin, since nutrients in them are found within cells involved by a layer of a low digestibility material (cellulose, hemicellulose, lignin), making the access of the digestive enzymes to them become difficult.

In Brazil, the patent application BR 0904841-3 presents the formulation of an extruded product, intended for the nutrition of ruminants, based on subproducts or co-products originated from agricultural industries.

Other than in the patent field, similar products currently found in the market either are not extruded, or do not include fiber products, culture residues or haystacks, or are also too expensive and economically unfeasible to cattle breeders.

The development of the patent application as presented herein has taken into consideration products as known in the current state of the art, with the object to develop a product with a more accessible cost to the market, better prepared from the nutritional point of view and applied to other animal species, besides ruminants.

Therefore, formulations have been studied with other kinds of food originating from different cultures from those as disclosed and taught by the patent applications as mentioned by the description of the state of the art, as well as currently known products in the market of feed for ruminants and equines.

As a result of research and development, the formulation as claimed has been obtained, which combination of formulated foods presents better energy and nutritional efficacy, with significant reduction in the cost of the final product, due to the abundant raw material as used being originated from haystacks of annual and/or perennial crops, especially from sugar cane and grass, but not excluding haystacks of corn, soy, sorghum, millet, wheat, triticale, bulgur, ryegrass, oats, sugar cane bagasse and many others, as well as their crop residues.

Therefore, the patent application as presented herein has developed a formulation making use of these other feeds with significant gains in production efficiency for the animals as fed, also reducing costs for cattle raisers.

The disclosed formulation, besides being innovative, includes the possibility of providing feed for equines, which have not been mentioned by the inventions as previously mentioned.

It also presents a sensitive and necessary adjustment to the supply of product minerals to animal diet.

Advantages of the Invention Over the State of the Art

The feed, concentrate and supplement formulation based on crop haystacks or culture residues, used for the nutrition of ruminants and/or equines, is fully extruded, with its composition having fiber food or crop residues and haystacks, besides presenting viable economical costs, even in comparison with related products from the nutritional market. It is very efficient from the nutritional point of view, as concluded from researches in the field.

The patent application as presented improves the use of food as included in the final product by ruminants and equines, with gains in digestibility and utilization, consequently improving the efficiency of the rational use of nutritional resources with those species, with economic benefits for the exploitation activity as intended.

OBJECT OF THE INVENTION

The object of the invention is to complement or meet nutritional requirements from ruminants and/or equines, working as food to be provided to the species intended for nutrition with animal feed, concentrate or supplement, disclosing a product with significant reduction of the final cost, due to the abundance of raw material as used, originated from annual and/or perennial crop haystacks, such as: sugar cane, grass, corn, soy, sorghum, millet, wheat, triticale, bulgur, ryegrass, oats, sugar cane bagasse and many others, as well as their crop residues.

Another object of the invention consists in improving the use of food as included in the final product, with gains in digestibility, consequently improving the efficiency of the rational use of nutritional resources with those species.

DETAILED DESCRIPTION OF THE INVENTION

The invention refers to the formulation of food classified as animal feed, concentrate and supplement, with extruded characteristics, which process involves passing the mass of ingredients as adequately mixed, be them milled or not, to the equipment known as thermoplastic food extruder. It is based on the use of products of vegetal origin, valuable products and fiber subproducts, especially crop haystacks or culture residues.

The raw material as used is originated from annual and/or perennial crop haystacks, especially from sugar cane and grass, but not excluding haystacks of corn, soy, sorghum, millet, wheat, triticale, bulgur, ryegrass, oats, sugar cane bagasse and many others, as well as their crop residues.

The formulation object of the patent application for animal feed, concentrate or supplement for ruminants or equines follows the quantitative and qualitative table as presented below, using at least one of the constituents as mentioned on said table as a source of energy, source of protein, source of nitrogen, source of fiber, source of minerals and additive(s), under the following percent quantities, by weight:

| | |
|---|---|
| Source of Energy: corn, sorghum, soy molasses, corn germen, protected palm fat, sugar cane molasses, corn oil and soybean oil. | 1% to 70% |
| Source of Protein: soy bran, cotton bran, sugar cane yeast, soy meal and sunflower bran. | 1% to 42% |
| Source of Nitrogen: urea for cattle-raising. | 0.0% to 8% |
| Source of minerals: dicalcium phosphate, calcium carbonate, calcium sulfate, potassium chloride, ammonium chloride, filtered sulfur, zinc oxide, organic chromium, organic zinc, copper sulfate, magnesium oxide, sodium chloride, manganese monoxide, cobalt sulfate, calcium iodate, organic selenium, sodium selenite and sodium bicarbonate. | 0.2% to 20% |
| Source of fiber: sugar cane straw (hay) and/or corn straw (hay) and/or sunflower bran and/or grass haystack (hay) and/or sugar cane bagasse. | 5% to 60% |
| Additive: sodium monensin, virginiamycin, lysine, tannin from chestnut and/or ash tree. | 0.0% to 0.2% |

The preferred modes of formulation of animal feed, respectively, for ruminants and equines, are shown below, highlighting quantities by weight, for use of at least one of the constituents as mentioned on said table as a source of energy, source of protein, source of nitrogen, source of fiber, source of minerals and additive(s), as per the table below:

| Source of Energy: corn, sorghum, soy molasses, corn germen, protected palm fat, sugar cane molasses, corn oil, soybean oil. | Source of Protein: soy bran, cotton bran, sugar cane yeast, soy meal and sunflower bran. | Source of Nitrogen: urea for cattle-raising | Source of Minerals: dicalcium phosphate, calcium carbonate, calcium sulfate, potassium chloride, ammonium chloride, filtered sulfur, zinc oxide, organic chromium, organic zinc, copper sulfate, magnesium oxide, sodium chloride, manganese monoxide, cobalt sulfate, calcium iodate, organic selenium, sodium selenite, sodium bicarbonate. | Source of Fiber: sugar cane straw (hay) and/or corn straw (hay) and/or sunflower bran and/or grass straw (hay) and/or sugar cane bagasse. | Additive: sodium monensin, virginiamycin, lysine, tannin from chestnut and/or ash tree. |
|---|---|---|---|---|---|
| 60% to 70% | 25% to 30% | 0% to 8% | 3% to 5% | 5% to 60% | 0.1% to 0.2% |
| 40% to 50% | 9% to 15% | 0% | 1% to 2% | 40% to 50% | 0% |

Two preferred embodiments of the formulation of concentrate for ruminants are shown below, highlighting the quantities by weight for the use of at least one of the constituents as mentioned by said table as a source of energy, source of protein, source of nitrogen, source of fiber, source of minerals and additive(s), as per the table below:

| Source of Energy: corn, sorghum, soy molasses, protected palm fat, sugar cane molasses, corn oil, soybean oil. | Source of Protein: soy bran, cotton bran, sugar cane yeast, powdered milk and sunflower bran. | Source of Nitrogen: urea for cattle-raising | Source of Minerals: dicalcium phosphate, calcium carbonate, calcium sulfate, potassium chloride, filtered sulfur, zinc oxide, organic chromium, organic zinc, copper sulfate, magnesium oxide, sodium chloride, manganese monoxide, cobalt sulfate, calcium iodate, organic selenium, sodium selenite, sodium bicarbonate. | Source of Fiber: sugar cane straw (hay) and/or corn straw (hay) and/or sunflower bran and/or grass straw (hay) and/or sugar cane bagasse. | Additive: sodium monensin, virginiamycin, lysine, tannin from chestnut and/or ash tree. |
|---|---|---|---|---|---|
| 35% to 45% | 12% to 18% | 3% to 5% | 9% to 12% | 30% to 40% | 0.1% to 0.2% |
| 3% to 8% | 80% to 90% | 2% to 4% | 6% to 9% | 25% to 35% | 0.025% to 0.035% |

Three preferred embodiments of the formulation of supplement for ruminants are shown below, highlighting the quantities by weight for the use of at least one of the constituents as mentioned in said table as the source of energy, source of protein, source of nitrogen, source of fiber and additive, as per the table below:

| Source of Energy: corn, sorghum, soy molasses, protected palm fat, sugar cane molasses, corn oil, soybean oil. | Source of Protein: soy bran, cotton bran, sugar cane yeast, powdered milk and sunflower bran. | Source of Nitrogen: urea for cattle-raising | Source of Minerals: dicalcium phosphate, calcium carbonate, calcium sulfate, potassium chloride, filtered sulfur, zinc oxide, organic chromium, organic zinc, copper sulfate, magnesium oxide, sodium chloride, manganese monoxide, cobalt sulfate, calcium iodate, organic selenium, sodium selenite, sodium bicarbonate. | Source of Fiber: sugar cane straw (hay) and/or corn straw (hay) and/or sunflower bran and/or grass straw (hay) and/or sugar cane bagasse. | Additive: sodium monensin, virginiamycin, lysine, tannin from chestnut and/or ash tree. |
|---|---|---|---|---|---|
| 40% to 50% | 25% to 30% | 4% to 8% | 14% to 20% | 15% to 20% | 0.1% to 0.2% |
| 25% to 35% | 45% to 50% | 0% | 10% to 15% | 10% to 15% | 0.1% to 0.2% |
| 25% to 35% | 15% to 25% | 4% to 8% | 13% to 18% | 15% to 20% | 0.1% to 0.2% |

It is important to highlight that, in the nutritional formulation presented as animal feed, concentrate and supplement, when formulated for equines, the source of nitrogen should always be 0.0%.

The Formulations have been shown to be more effective for ruminants when used in the following quantitative and qualitative ratios:

at least one source of fiber, based on sugar cane haystack, corn haystack, grass haystack, sugar cane bagasse and sunflower bran, under the ratio between 5 and 60% by weight;

source of nitrogen based on urea for cattle-raising, under the ratio between 0.01% and 8% by weight;

at least one source of protein based on soy bran, cotton bran, sugar cane yeast, soy meal and sunflower bran, under the ratio between 1% and 42% by weight;

at least one source of energy: corn, sorghum, soy molasses, sugar cane molasses, corn germen, corn oil, soybean oil and protected palm fat, under the ratio between 3% and 70% by weight;

at least one source of minerals: dicalcium phosphate, calcium carbonate, calcium sulfate, potassium chloride, ammonium chloride, filtered sulfur, zinc oxide, organic chromium, organic zinc, copper sulfate, magnesium oxide, sodium chloride, manganese monoxide, cobalt sulfate, calcium iodate, organic selenium, sodium bicarbonate and sodium selenite, under the ratio between 0.2% and 20% by weight; and at least one additive: sodium monensin, virginiamycin, lysine and tannin from chestnut and/or ash tree, under the ratio between 0.01% and 0.2% by weight.

The Formulations have been shown to be more effective for equines when used under the following ratios:

at least one source of fiber, based on sugar cane haystack, corn haystack, grass haystack, sugar cane bagasse and sunflower bran, under the ratio between 10 and 50% by weight;

at least one source of protein based on soy bran, cotton bran, sugar cane yeast, soy meal and sunflower bran, under the ratio between 1% and 42% by weight;

at least one source of energy: corn, sorghum, soy molasses, sugar cane molasses, corn germen, corn oil, soybean oil and protected palm fat, under the ratio between 3% and 70% by weight;

at least one source of minerals: dicalcium phosphate, calcium carbonate, calcium sulfate, potassium chloride, ammonium chloride, filtered sulfur, zinc oxide, organic chromium, organic zinc, copper sulfate, magnesium oxide, sodium chloride, manganese monoxide, cobalt sulfate, calcium iodate, organic selenium, sodium bicarbonate and sodium selenite, under the ratio between 0.2% and 20% by weight; and at least one additive: sodium monensin, virginiamycin, lysine and tannin from chestnut and/or ash tree, under the ratio between 0.01% and 0.2% by weight.

It is important to highlight that, for this formulation, no source of nitrogen is used.

The animal feed for ruminants and equines has shown to be fully effective for the ratios as disclosed below, highlighting that, for equines, no source of nitrogen is used:

at least one source of fiber, based on sugar cane haystack, corn haystack, sunflower haystack, grass haystack and sugar cane bagasse, under the ratio between 5 and 60% by weight;

source of nitrogen based on urea for cattle-raising, under the ratio between 0.01% and 8% by weight;

at least one source of protein based on soy bran, cotton bran, sugar cane yeast, soy meal and sunflower bran, under the ratio between 1% and 42% by weight;

at least one source of energy: corn, sorghum, soy molasses, corn germen, sugar cane molasses, corn oil, soybean oil and protected palm fat, under the ratio between 3% and 70% by weight;

at least one source of minerals: dicalcium phosphate, calcium carbonate, calcium sulfate, potassium chloride, ammonium chloride, filtered sulfur, zinc oxide, organic chromium, organic zinc, copper sulfate, magnesium oxide, sodium chloride, manganese monoxide, cobalt sulfate, calcium iodate, organic selenium, sodium bicarbonate and sodium selenite, under the ratio between 0.2% and 20% by weight; and at least one additive: sodium monensin, virginiamycin, lysine and tannin from chestnut and/or ash tree, under the ratio between 0.01% and 0.2% by weight.

The concentrate for ruminants and equines has shown to be fully effective for the ratios as disclosed below, highlighting that, for equines, no source of nitrogen is used:

at least one source of fiber, based on sugar cane haystack, corn haystack, grass haystack, sugar cane bagasse and sunflower bran, under the ratio between 10 and 50% by weight;

source of nitrogen based on urea for cattle-raising, under the ratio between 0.01% and 8% by weight;

at least one source of protein based on soy bran, cotton bran, sugar cane yeast, soy meal and sunflower bran, under the ratio between 1% and 42% by weight;

at least one source of energy: corn, sorghum, soy molasses, corn germen, sugar cane molasses, corn oil, soybean oil and protected palm fat, under the ratio between 3% and 70% by weight;

at least one source of minerals: dicalcium phosphate, calcium carbonate, calcium sulfate, potassium chloride, ammonium chloride, filtered sulfur, zinc oxide, organic chromium, organic zinc, copper sulfate, magnesium oxide, sodium chloride, manganese monoxide, cobalt sulfate, calcium iodate, organic selenium, sodium bicarbonate and sodium selenite, under the ratio between 0.2% and 20% by weight; and at least one additive: sodium monensin, virginiamycin, lysine and tannin from chestnut and/or ash tree, under the ratio between 0.01% and 0.2% by weight.

The supplement for ruminants and equines has shown to be fully effective for the ratios as disclosed below, highlighting that, for equines, no source of nitrogen is used:

at least one source of fiber, based on sugar cane haystack, corn haystack, grass haystack, sugar cane bagasse and sunflower bran, under the ratio between 5% and 60% by weight;

source of nitrogen based on urea for cattle-raising, under the ratio between 0.01% and 8% by weight;

at least one source of protein based on soy bran, cotton bran, sugar cane yeast, soy meal and sunflower bran, under the ratio between 1% and 42% by weight;

at least one source of energy: corn, sorghum, soy molasses, sugar cane molasses, corn germen, corn oil, soybean oil and protected palm fat, under the ratio between 3% and 70% by weight;

at least one source of minerals: dicalcium phosphate, calcium carbonate, calcium sulfate, potassium chloride, ammonium chloride, filtered sulfur, zinc oxide, organic chromium, organic zinc, copper sulfate, magnesium oxide, sodium chloride, manganese monoxide, cobalt sulfate, calcium iodate, organic selenium and sodium selenite, under the ratio between 0.2% and 20% by weight; and at least one additive: sodium monensin, virginiamycin, lysine and tannin from chestnut and/or ash tree, under the ratio between 0.01% and 0.2% by weight.

The invention claimed is:

1. A formulation for an animal consisting of:
   a milled thermally extruded mixture consisting of:
   5% to 60% by weight of at least one source of raw fiber selected from the group consisting of raw corn haystack, raw sugar cane bagasse, and raw sunflower bran;
   0.01% to 8% by weight of urea;
   1% to 42% by weight of at least one source of protein selected from the group consisting of soy bran, cotton bran, sugar cane yeast, and sunflower bran;
   3% to 70% by weight of at least one source of energy selected from the group consisting of corn, sorghum, soy molasses, corn germen, corn oil, soybean oil, and palm fat;

0.2% to 20% by weight of at least one source of minerals selected from the group consisting of calcium carbonate, calcium sulfate, potassium chloride, ammonium chloride, filtered sulfur, zinc oxide, organic chromium, organic zinc, copper sulfate, sodium chloride, manganese monoxide, cobalt sulfate, calcium iodate, organic selenium, sodium bicarbonate, and sodium selenite;

0.01% to 0.2% by weight of at least one additive including virginiamycin, lysine, tannin from chestnut, and/or ash tree; and wherein the formulation is an animal feed supplement.

2. The formulation of claim 1, wherein the animal is a ruminant or an equine.

3. An animal feed for ruminants or equines consisting of:

a milled thermally extruded mixture consisting of:

5% to 60% by weight of at least one source of raw fiber selected from the group consisting of raw corn haystack, raw sunflower bran, and raw sugar cane bagasse;

0.01% to 8% by weight of urea;

1% to 42% by weight of at least one source of protein selected from the group consisting of soy bran, cotton bran, sugar cane yeast, soy meal, and sunflower bran;

3% to 70% by weight of at least one source of energy selected from the group consisting of corn, sorghum, soy molasses, corn germen, sugar cane molasses, corn oil, soybean oil, and protected palm fat;

at least one source of minerals selected from the group consisting of dicalcium phosphate, calcium carbonate, calcium sulfate, potassium chloride, and ammonium chloride;

0.2% to 20% by weight of a filtered sulfur, zinc oxide, organic chromium, organic zinc, copper sulfate, sodium chloride, manganese monoxide, cobalt sulfate, calcium iodate, organic selenium, sodium bicarbonate, and sodium selenite;

0.01% to 0.2% by weight of at least one additive consisting of virginiamycin, lysine, or tannin from chestnut, or ash tree; and wherein the formulation is an animal feed supplement.

4. The formulation of claim 1, wherein the nutritional supplement is a supplement for ruminants or equines.

\* \* \* \* \*